United States Patent [19]
Sasaki et al.

[11] Patent Number: 5,770,142
[45] Date of Patent: Jun. 23, 1998

[54] PROCESS FOR MANUFACTURING SINTERED POLYBENZIMIDAZOLE ARTICLE

[75] Inventors: Yoshisato Sasaki; Minoru Kurisaki, both of Tokyo, Japan

[73] Assignee: Hoechst Japan Limited, Tokyo, Japan

[21] Appl. No.: 874,860

[22] Filed: Jun. 13, 1997

[30] Foreign Application Priority Data

Nov. 29, 1996 [JP] Japan ..................... 8-335002

[51] Int. Cl.$^6$ .............. C08G 33/02; B27J 5/00; C08J 5/00
[52] U.S. Cl. .............. 264/331.12; 264/126; 528/331; 528/342; 528/481; 528/502
[58] Field of Search .............. 264/126, 331.12; 528/331, 342, 481, 502

[56] References Cited

U.S. PATENT DOCUMENTS

| 3,340,325 | 9/1967 | Suffredini . | |
|---|---|---|---|
| 4,263,245 | 4/1981 | Tan | 264/184 |
| 4,814,530 | 3/1989 | Ward | 528/342 |

*Primary Examiner*—Morton Foelak
*Attorney, Agent, or Firm*—Foley & Lardner

[57] ABSTRACT

Provided is a process for manufacturing sintered polybenzimidazole (PBI) articles at high yields, said articles having neither voids nor porous, low-strength parts resulting from oxidative deterioration. To produce said sintered PBI articles from a particulate PBI resin, said PBI resin is compacted in a closed mold, the mold is heated up to a predetermined temperature of from 350° to 600° C. without applying any external pressure thereto, then, after having heated up to said predetermined temperature, the mold is pressed to have a predetermined external pressure of from 140 to 1400 kg/cm2 at said predetermined temperature whereby the resin is sintered for from 60 to 350 minutes under that conditions, and finally the sintered PBI article is cooled and taken out of the mold.

5 Claims, 2 Drawing Sheets

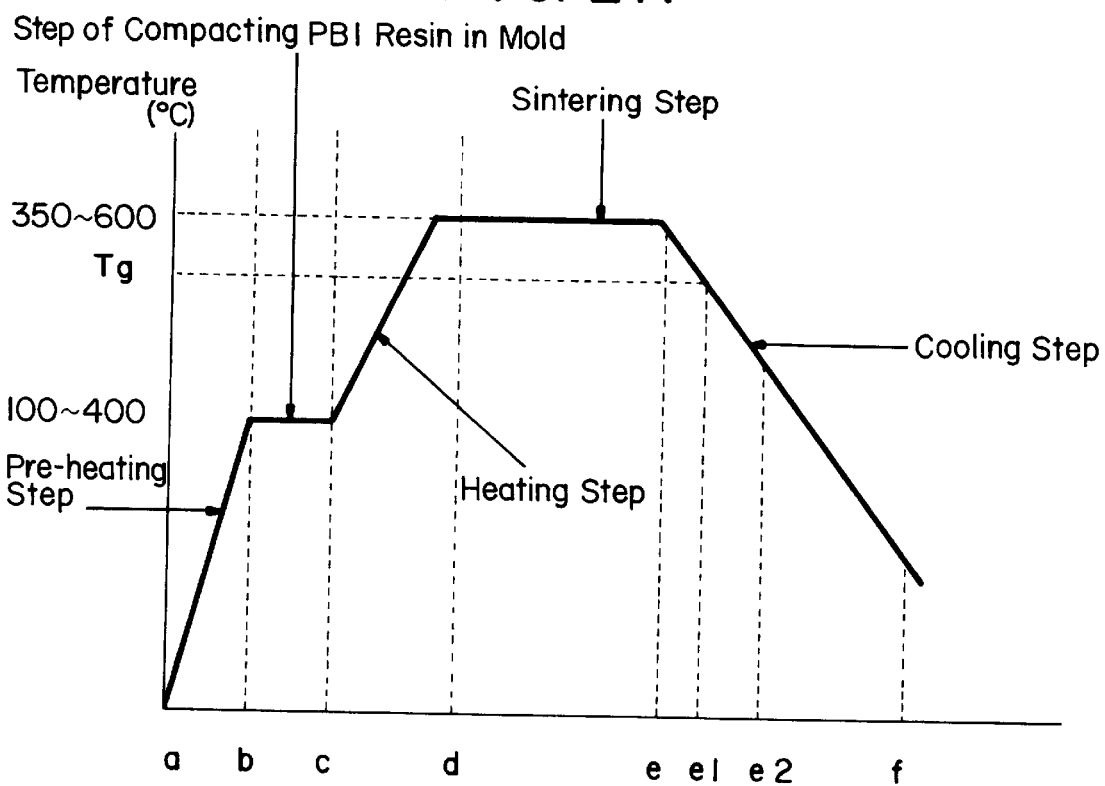
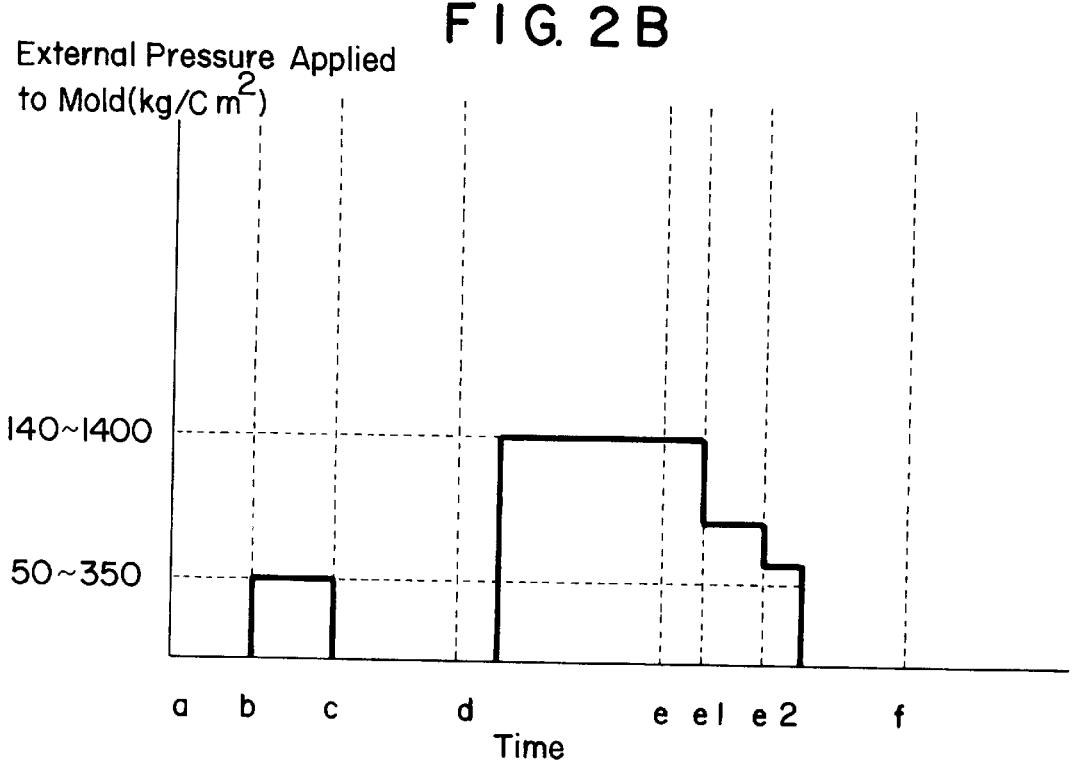

PROCESS FOR MANUFACTURING SINTERED POLYBENZIMIDAZOLE ARTICLE

FIELD OF THE INVENTION

This invention relates to a process for manufacturing sintered polybenzimidazole (hereinafter referred to as PBI) articles.

BACKGROUND OF THE INVENTION

PBI is known as a polymer which can be used in a broad temperature range while having excellent characteristics such as high mechanical strength, high chemical resistance, high solvent resistance, high radiation resistance and high flame resistance. As one example of manufacturing sintered PBI articles by sintering PBI, known is a method of sintering a mixture comprising a PBI polymer and a PBI prepolymer as a sintering aid under sufficient heat and pressure (see U.S. Pat. No. 3,340,325). However, as producing a mixed gas comprising phenol vapor and water vapor, this method is problematic in that care must be taken in the sintering operation and that many voids remain in the products resulting in the failure in manufacture of thick products.

As opposed to this, the sintered PBI articles developed by Hoechst Celanese Corporation are superior to conventional ones as having good physical properties and being able to be practicably thick. Said excellent articles are manufactured according to the Hoechst Celanese's sintering process for manufacturing them, which is as follows (see U.S. Pat. No. 4,814,530):

A particulate PBI resin having a particle size not larger than 100 mesh-screen, having a water and volatiles content of not larger than 0.1% by weight and having an inherent viscosity of at least 0.4 is compacted in a mold at room temperature for at least 1 minute under a pressure of from 2000 to 20000 psi, then the thus-compacted PBI resin is heated at temperatures falling between 825° F. and 950° F. with maintaining said pressure range (heating step), and, after the PBI resin has been heated up to the predetermined temperature falling within said range, the pressure is removed, and thereafter said PBI resin is further heated at least at said temperature for 4 hours (sintering step). After this, the resulting PBI article is again compressed under a pressure falling within said range, and then, after once cooled to 800° F. or lower, this is again heated and kept at a temperature falling between 825° F. and 950° F. for at least one hour under the same pressure (post-curing step). Through this process, manufactured are the sintered PBI articles.

One typical profile of the relationship between the time-dependent temperature and pressure in said Hoechst Celanese's PBI sintering process is shown in FIG. 1, in which the horizontal axis indicates the varying time and the vertical axis in the upper graph indicates the varying temperature while that in the lower graph indicates the varying external pressure to be applied to the mold. In the Hoechst Celanese's process, a PBI resin from which water and volatiles have been removed in order to prevent the formation of voids is first loaded into a mold, and then compacted therein under pressure (time c). The time of from c to d is for the heating step of heating the PBI resin up to the sintering temperature prior to being sintered. In this heating step, the PBI resin is heated while pressure is applied to the mold. The heating temperature is a predetermined one to fall between 440° C. and 510° C. The time for the heating is from 1 hour and 30 minutes to 2 hours and 30 minutes. The time of from d to e is for the sintering step of sintering the PBI resin, before which the pressure to the mold is removed and in which the predetermined temperature is maintained. The time of from e to f is for the post-curing step, which follows said sintering step and in which the pressure that is the same as that employed in the heating step is again applied to the mold in order to prevent the sintered PBI from being expanded, and the sintered PBI is once cooled to below Tg of PBI resin and then again heated to the temperature that is the same as that employed in the sintering step while said elevated pressure is maintained to thereby post-cure the sintered PBI. At the time f, the pressure is removed, and then the sintered PBI is cooled and thereafter taken out of the mold.

This process could produce sintered PBI with good characteristics, but is still problematic in various points such as those mentioned below. In this process, since pressure is applied to the PBI resin all the time during the heating step, the decomposed gas resulting from the heating of said PBI resin could not escape from within the sintered PBI article but remains therein as voids. These voids cause the cracking of the article, resulting in the increase in defective products. The decomposed gas comprises the vapor resulting from the decomposition of the non-polymerized PBI resin itself and the vapor resulting from the reaction of lithium chloride (LiCl) (this is added to the PBI resin as a stabilizer) with the PBI resin at high temperatures. Concretely, the decomposed gas may include, for example, $CO$, $CO_2$, $CH_4$, chloroform and phenol. This vapor composition was confirmed through gas chromatographic mass analysis of the gas that results from the heating of the PBI resin at about 500° C. On the other hand, in the sintering step, since the pressure is not applied to the mold, the sintered PBI article expands, resulting in the failure in obtaining products having desired shapes. For this, two essential factors are referred to; one being the expansion (spring back) of the sintered article itself due to the none-pressure applying to the mold, and the other being the generation of the decomposed PBI gas to cause the expansion of the sintered article.

Since the part of the PBI resin that has expanded due to said spring back of itself is contacted with oxygen in air that may penetrate into the mold, it could not be sintered but is oxidized to be porous. The strength of said porous part is lowered to be about 80% as compared with the other sintered part. Thus, the sintered PBI articles having such porous parts are unsuitable to practical use.

The subject matter of the present invention is to provide a process for manufacturing sintered PBI articles with no porous part to be caused by the spring back of PBI, while minimizing the voids that shall result from the gas to be generated by the heating of PBI.

SUMMARY OF THE INVENTION

We, the present inventors have assiduously studied so as to attain the above-mentioned subject matter, and, as a result, have found that, when the pressing device of a mold, into which a PBI resin to be sintered is put, is fixed and restrained in such a manner that the PBI resin being in the mold is well compacted therein in the absence of any external pressure being applied to said PBI resin, and when said PBI in said condition is heated up to a sintering temperature and thereafter sintered under a predetermined pressure, then the formation of voids in the sintered PBI article can be prevented and the expansion of the sintered PBI article due to its spring back can also be prevented. On the basis of these findings, the inventors have completed the present invention.

Accordingly, the present invention provides a process for manufacturing sintered PBI articles by sintering a PBI resin, which comprises the following steps in that order:

(1) a step of putting a PBI resin into a mold having a predetermined shape;

(2) a step of closing the mold to thereby compact the PBI resin therein, followed by heating the mold up to a predetermined temperature of from 350° C. to 600° C. in the absence of any external pressure to the mold, (3) a step of sintering the resin, after having reached the predetermined temperature, in such a manner that said elevated temperature is kept as it is for from 0 to 100 minutes, then the pressure to the mold is increased up to a predetermined pressure of from 140 to 1400 kg/cm$^2$, and thereafter said elevated temperature and said increased pressure are kept as they are for from 60 to 250 minutes;

(4) a step of cooling the mold down to a temperature of from 50° to 400° C.; and (5) a step of taking out the sintered PBI article from the mold.

BRIEF DESCRIPTION OF THE DRAWINGS

FIG. 2 shows the time-dependent relationship between the varying temperature and the varying pressure to be employed in the process of this invention for manufacturing sintered PBI articles.

DESCRIPTION OF PREFERRED EMBODIMENTS OF THE INVENTION

Figure 1A:
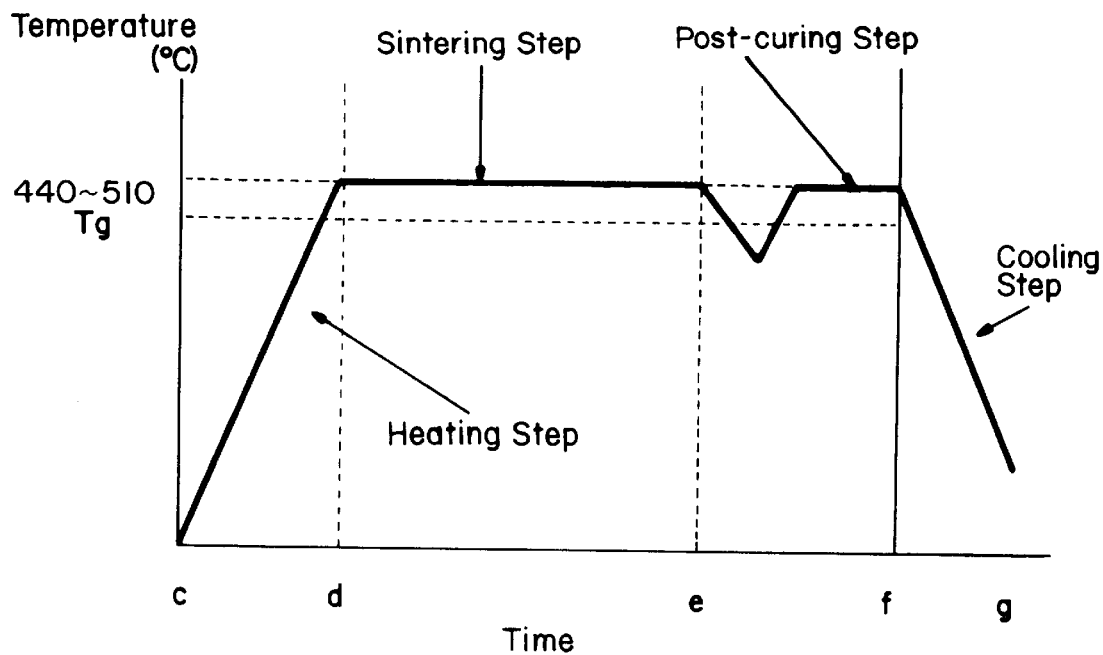
FIG. 1 shows the time-dependent relationship between the varying temperature and the varying pressure to be employed in the conventional sintering process, the above-mentioned Hoechst Celanese's process for manufacturing sintered PBI articles.
Figure 1B:
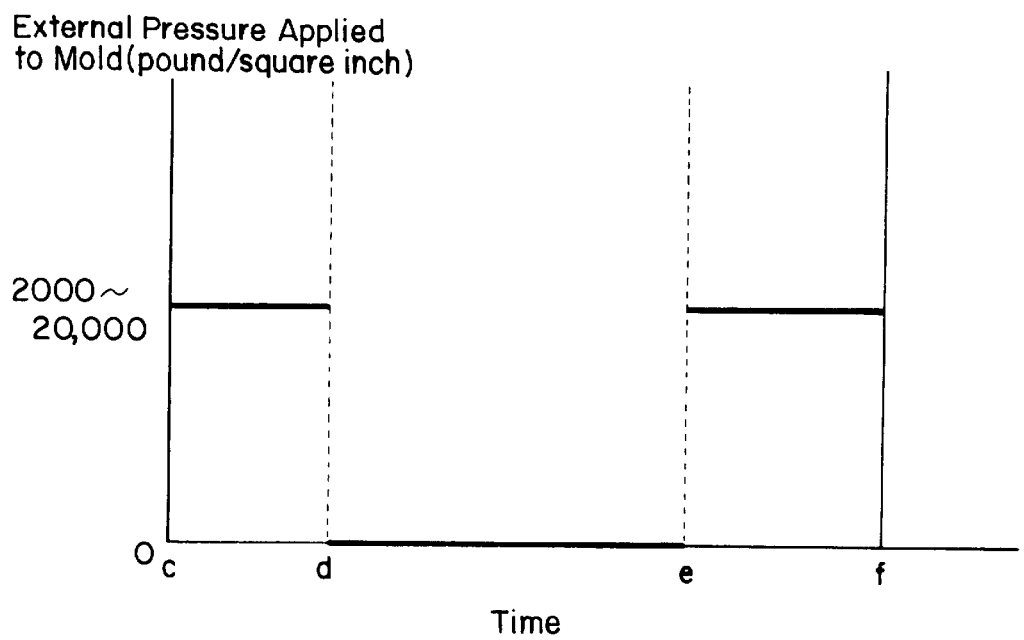

In general, PBI resins of the following formula may be used for manufacturing the sintered PBI articles of the present invention.

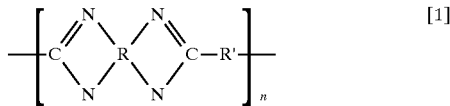

[1]

wherein R that constitutes the recurring units is a tetravalent aromatic nucleus with the nitrogen atoms forming the benzimidazole rings being paired upon adjacent carbon atoms, i.e., ortho carbon atoms, of the aromatic nucleus; R' that also constitutes the recurring units is a divalent group of the class consisting of an aromatic ring, an alkylene group (preferably having 4 to 8 carbon atoms) and a heterocyclic ring such as pyridine, pyrazine, furan, quinoline, thiophene and pyran; and R and R' both may be the same or different in the recurring polymer chains.

Examples of PBIs of the above-mentioned formula may include the following polymers and copolymers:

poly-2,2'-(m-phenylene)-5,5'-bibenzimidazole;
poly-2,2'-(biphenylene-2",2''')-5,5'-bibenzimidazole;
poly-2,2'-(biphenylene-4",4''')-5,5'-bibenzimidazole;
poly-2,2'-(1",1",3"-trimethylindanylene)-3",5"-p-phenylene-5,5'-bibenzimidazole;
2,2'-(m-phenylene)-5,5'-bibenzimidazole/2,2'-(1",1",3"-trimethylindanylene)-5",3"-(p-phenylene)-5,5'-bibenzimidazole copolymer;
2,2'-(m-phenylene)-5,5'-bibenzimidazole/2,2'-biphenylene-2",2'''-5,5'-bibenzimidazole copolymer;
poly-2,2'-(furylene-2",5")-5,5'-bibenzimidazole;
poly-2,2'-(naphthalene-1",6") -5,5'-bibenzimidazole;
poly-2,2'-(naphthalene-2",6") -5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2'-(m-phenylene)-5,5"-di(benzimidazole)propane-2,2; and
poly-ethylene-1,2,2,2"-(m-phenylene)-5,5"-di(benzimidazole)ethylene-1,2
where the double bonds of the ethylene groups are intact in the final polymer.

One preferred polymer is poly-2,2'-(m-phenylene)-5,5'-bibenzimidazole.

As the starting PBI resins, in general, usable herein are those having the physical properties mentioned below.

PBI resins having an inherent viscosity (IV) of not smaller than 0.4 dl/g at 25° C. as a solution prepared by dissolving 0.4 g of PBI in 100 ml of 97 wt. % sulfuric acid;

PBI resins having a particle size of not larger than 500 μm, preferably not larger than 150 μm; and PBI resins having a water and volatiles content of not larger than 0.1% by weight.

The restriction of the particle size of the starting PBI resins is based on the reason because, if the particle size is larger than 500 μm, the complete removal of voids initially existing in the PBI particles is difficult. Since PBI resins which are solid at room temperature are hygroscopic, they generally contain from about 2–3% by weight of water. If these PBI resins having such a water content are sintered, the sintered PBI articles will inevitably have voids. Therefore, it is desirable to dry the PBI resins, for example, at 150° C. for 12 hours or longer, or at 177° C. for 4 hours or longer, thereby making the PBI resins have a water and volatiles content of not larger than 0.1% by weight. The volatiles as referred to herein indicate phenol and others that result from the partial decomposition of PBI during the synthesis of PBI.

The sintering process of this invention comprises the heating step, the sintering step and the cooling step.

If the mold is pre-heated, before or after the step of putting a PBI resin thereinto, at a temperature falling between 100° C. and 400° C., preferably between 250° C. and 300° C., rapid heat transfer to the PBI resin is possible and the total processing time for the production of sintered PBI articles can be shortened. Therefore, the process of this invention may optionally comprise said pre-heating step.

This pre-heating can be effected by putting the mold in an oven having forced air convection therein, or by heating the mold with a heater as built in said mold.

To carry out the process of this invention, a PBI resin, which has been preferably pre-dried, is first charged into a mold (charging step). Next, prior to the next heating step, it is desirable to compact the PBI resin by pressing it, thereby degassing the mold. The pressure for this compacting may be suitably from 50 to 350 kg/cm$^2$. Though depending on the size and the shape of the intended sintered article, the compacting time may be generally within 30 minutes or shorter. A filler having a minimized volatiles content, such as graphite, glass, glass fiber or carbon fiber, may be added to the starting PBI resin, depending on the intended characteristics of the sintered PBI to be obtained. After the PBI resin has been well compacted in the mold, the pressing device is fixed and restrained so that it is not moved from the predetermined position. Where pressure is applied for the compacting mentioned above, this is removed to be 0 kg/cm$^2$.

Next, before the sintering step, the mold is heated up to the sintering temperature (heating step). In this heating step, it is important that any external pressure should not be applied to the mold. In other words, the mold is fixed and restrained at the pressing position at which the PBI resin was compacted in the mold. In this condition, no external pressure shall be applied to the pressing device of the mold, or that is, the pressure to the mold shall be 0 kg/cm$^2$. The highest temperature to which the PBI resin in the mold is heated is selected from the range between 350° C. and 600° C. The temperature at which the heating is started may be from 100° C. to 400° C., if the mold is pre-heated; or may be room temperature when the mold is not pre-heated. In this heating step, no pressure is applied to the PBI resin in the mold. Therefore, even if PBI is decomposed to give gas, said gas may be easily removed out of the mold via its slits, resulting in great reduction in the formation of voids (these voids are inevitable in conventional sintered PBI articles) in the sintered PBI articles to be finally obtained herein. This heating may be effected by the heater as built in the mold or by any other heating means capable of attaining the intended heating. Considering the next heating step, the mold to be used herein is advantageously one as combined with a pressing device. The time for the heating step may be preferably from 1 hour and 30 minutes to 2 hours and 30 minutes.

After this heating step, pressure is applied to the mold thus heated up to the sintering temperature, with maintaining said elevated temperature, and the PBI resin is sintered in this mold (sintering step). In this sintering step, the PBI resin is still kept at the elevated temperature of from 350° C. to 600° C., to which is applied a constant pressure which is necessary for the sintering and which falls between 140 kg/cm$^2$ and 1400 kg/cm$^2$. In this step, it is desirable that the predetermined temperature and pressure be kept constant as much as possible within the defined ranges. For this, for example, suitable apparatus is a thermostat combined with a device, by which the temperature and/or the pressure are/is restored to the predetermined one(s), if having varied within a predetermined range of deviation. The time for the sintering may be suitably defined, depending on the size, thickness and shape of the intended article to be obtained after the sintering. In general, the time may fall between 60 minutes and 350 minutes.

Since almost all the decomposed gas of PBI is discharged out of the mold in the previous heating step, sufficient pressure can be applied to the PBI not containing the decomposed gas in this sintering step. Therefore, the contact area of the particulate PBI resin can be enlarged in this sintering step, in which, in addition, said PBI resin is shielded from air since pressure is applied to the mold, being different from the PBI resin to be sintered according to the above-mentioned Hoechst Celanese's process. Accordingly, since the PBI resin being sintered according to the process of this invention is not contacted with oxygen in air, it is hardly oxidized and decomposed. Therefore, the process of this invention can produce sintered PBI articles with high strength.

Finally, the sintered PBI article is cooled and then taken out of the mold (cooling step). In the process of this invention, it is desirable that the pressure be not removed immediately after the sintering step but be gradually reduced after the temperature of the sintered PBI article has become lower than the glass transition point (Tg) of the starting PBI resin when the sintering temperature is higher than Tg of the starting PBI resin. This is because, if the pressure is removed while the temperature of the sintered PBI article is still higher than said Tg, the removal of the pressure will cause spring back of the sintered PBI article, resulting in the expansion of the volume of the article. If so, sintered PBI articles with desired shapes are difficult to obtain.

Therefore, if the sintering temperature is higher than the glass transition point (Tg) of the starting PBI resin, it is desirable that the constant pressure kept during the sintering step be still kept even in the cooling step until the temperature of the sintered PBI articles reaches the glass transition point of the starting PBI resin. For example, where poly-2, 2'-(m-phenylene)-5,5'-bibenzimidazole is used as the starting PBI resin, the pressure can be lowered to 350 kg/cm$^2$ when the temperature of the sintered PBI article has become lower than the glass transition point of said PBI resin, 427° C. The pressure to be applied to said PBI article during cooling step may be obtained with reference to the relationship between the compressive strength (kg/cm$^2$) of the sintered article and the temperature thereof. From said relationship, the compressive strength of the sintered article corresponding to temperature is obtained, and the pressure to be applied to said article at the lowered temperature must be controlled to be not higher than said compressive strength of the article at said lowered temperature. In particular, when the temperature of the sintered PBI article is slightly lower than Tg of the starting PBI resin, the strength of the sintered article is not so high. In this condition, if a pressure higher than its compressive strength is applied to the sintered article, the article is broken. Therefore, it is important that the pressure to be applied to the sintered article be well controlled to evade such breakage of the article.

On the other hand, where the sintering temperature is set to be not higher than Tg of the starting PBI resin, the sintered PBI article is slightly apt to show spring back as compared with a case where the sintering temperature is set to be higher than Tg of the starting PBI resin. Also in this case where the sintering temperature is not higher than Tg of the starting PBI, therefore, it is still desirable that the sintered article be cooled under suitable pressure.

After the sintered article has been cooled to 300° C. or lower, it is taken out of the mold.

The time for the cooling step varies, depending on the size, thickness and shape of the sintered article, but may be generally from 2 hours to 6 hours.

In order to explain the present invention in more detail, one preferred embodiment of the sintering process of this invention is referred to hereinunder with reference to FIG. 2 which shows the time-dependent relationship between the temperature and the pressure employable in the process of this invention. In FIG. 2, the horizontal axis indicates the varying time; and the vertical axis in the upper graph indicates the varying temperature while that in the lower graph indicates the varying pressure.

The time from a to b is for the pre-heating step of pre-heating the mold to a temperature falling between 100° C. and 400° C., preferably between 250° C. and 300° C. This pre-heating step is an optional one to be effected, if desired, for shortening the time for the entire process of this invention.

The time from b to c is for the pre-treatment step of charging a PBI resin, which may be optionally dried, into a mold and compacting it therein. The pressure for this step may be generally from about 50 kg/cm$^2$ to about 350 kg/cm$^2$. If this step follows the previous pre-heating step, it is desirable that the pre-heated condition be still kept in this step.

The time from c to d is for the heating step of heating the compacted PBI resin to a temperature at which said PBI resin is sintered in the next sintering step. In this heating step, it is necessary that the pressing device of the mold be fixed at the position at which the PBI resin has been compacted in the previous step of from b to c, and that no external pressure is applied to the mold. Thus, the external pressure to be applied to the pressing device in this condition shall be 0 kg/cm$^2$. Where no pre-heating is operated in the previous step, the PBI resin in the mold is heated from room temperature up to a predetermined temperature falling between 350° C. and 600° C.; but where mold has been pre-heated in the previous step, the PBI resin in the mold is heated from said pre-heated temperature up to said predetermined temperature falling said range. The time for the heating step may be generally from 1 hour and 30 minutes to 2 hours and 30 minutes.

The time from d to e is for the sintering step where the PBI resin as heated in the mold up to said predetermined temperature is sintered while a predetermined pressure is applied to the mold. The application of the pressure to the mold is started from 0 to 100 minutes after the finish of the previous heating step, preferably after almost all the decomposed gas has been removed from the heated PBI resin, for example, from 5 to 60 minutes after the finish of the previous heating step. The time for the sintering step that includes the step of removing the decomposed gas and the step of pressing the mold may be from 60 to 350 minutes.

The time from e to f is for the cooling step of cooling the sintered PBI article after the sintering step. Where the sintering temperature employed in the previous sintering step is not lower than Tg of the starting PBI resin, sudden full removal of the pressure at a temperature higher than said Tg will cause the spring back of the sintered PBI article, often resulting in failure in the production of the desired article. In this case, therefore, it is desirable that the sintered PBI article be first cooled to the stage e1 (at which the temperature of the sintered PBI article is lower than Tg of the starting PBI resin) with no removal of the pressure, and thereafter the pressure is removed. If the sintered article has a complicated structure, the pressure may be removed in 2 or more stages. In addition, depending on the conditions for this step, the pressure may also be removed in 2 or more stages. As one example where poly-2,2'-(m-phenylene)-5,5'-bibenzimidazole is used as the starting PBI resin, the pressure is lowered to and set at 350 kg/cm$^2$ after the sintered PBI article has been cooled to lower than the glass transition point of the starting PBI resin, 427° C. (e1). Next, when the sintered PBI article has been further cooled to 350° C. (e2), the pressure can be lowered to and set at 190 kg/cm$^2$.

The sintered PBI articles obtainable according to the process of this invention have high chemical resistance to, for example, ketones, organic acids, oil well brines, oil well sour gas, and aromatic, aliphatic and halogenated hydrocarbons. Therefore, the sintered PBI articles obtainable according to the process of this invention are particularly effective in applications where requirements cannot be met by other resins—in extreme high temperatures, in harsh chemical environments, or in applications where durability and wear resistance are important. The sintered BPI articles obtainable according to the process of this invention are especially preferably used in manufacture of gaskets, seals, o-rings, bearings, semiconductors-tooling devices, gears, bearings and valves in the field of petroleum, geothermal, petrochemical industry and in other industrial applications.

The present invention will be described in more detail by means of the following examples, which, however, are not intended to restrict the scope of the invention.

EXAMPLES

A particulate PBI resin, poly-2,2'-(m-phenylene)-5,5'-bibenzimidazole having an inherent viscosity of 0.55 dl/g was dried for 12 hours in a forced air convection oven at 150° C., to thereby remove the water and volatile content from the resin.

A mold of 320 millimeters square×35 millimeters thick in size was pre-heated at 200° C., and 6 kg of the dried powdery PBI resin was loaded into the mold, and pressed on a 650-ton oil press at 100 kg/cm$^2$ to thereby compact the resin in the mold. Next, the upper ram of this press was fixed at the compacted position, and the pressure was removed to be 0 kg/cm$^2$ in the mold. The resin in the mold was heated up to 470° C. with the heater built in the mold, without imparting any external pressure thereto. This heating step took 2 hours. After 30 minutes, 600 kg/cm$^2$ pressure was applied to the mold still at 470° C., and kept for 3 hours also still at 470° C.

After this, the mold was cooled in the following manner. First, after the mold was cooled to lower than 427° C., the pressure to the mold was lowered to 350 kg/cm$^2$. Next, after the mold was further cooled to about 200° C., the sintered article was taken out of the mold. This sintered article had a tensile strength of 1800 kg/cm$^2$ on an average at 23° C.

TABLE 1

| Physical Properties | Condition | standard | Unit | Example 1 | Example 2 | Example 3 | Example 4 | Example 5 | Average | Compara. Example |
|---|---|---|---|---|---|---|---|---|---|---|
| Tensile Strength at Breakage | 23° C. | JIS K7113 | kg/cm$^2$ | 1640 | 1790 | 1880 | 1840 | 1850 | 1800 | 1630 |
| Tensile Elongation at Breakage | 23° C. | | % | 4.0 | 4.0 | 4.0 | 4.0 | 4.0 | 4.0 | 3.0 |
| Modulus of Elasticity | 23° C. | | kg/cm$^2$ | 65600 | 67000 | 66600 | — | — | 66400 | 66000 |
| Mean Thermal Expansion Coefficient | 24 to 150° C. | ASTM TMA | 1/°C. | $2.4 \times 10^{-5}$ | — | — | — | — | $2.4 \times 10^{-5}$ | $2.3 \times 10^{-5}$ |
| | 200 to 300° C. | | 1/°C. | $3.5 \times 10^{-5}$ | — | — | — | — | $3.5 \times 10^{-5}$ | — |
| Poisson Ratio | | | | 0.35 | 0.35 | — | — | — | 0.35 | 0.34 |

TABLE 1-continued

| Physical Properties | Condition | standard | Unit | Example 1 | 2 | 3 | 4 | 5 | Average | Compara. Example |
|---|---|---|---|---|---|---|---|---|---|---|
| Dielectric Breakdown Strength | 27° C. in ordinary oil | JIS C2110 | kV/mm | 22 | 25 | 26 | 24 | 22 | 24 | 21 |

COMPARATIVE EXAMPLE

The same particulate PBI resin as in Example 1 was dried in the same manner as in Example 1. In order to obtain a sintered article of 270 millimeters—outside-diameter, 180 millimeters—inside-diameter, 30 millimeters—thick in size, the resin was loaded into a mold, which was then immediately pressed at 350 kg/cm². After this was heated up to 460° C., the pressure was removed, and the resin was kept in the mold at 460° C. for 4 hours. After this, the sintered PBI article was again pressed at 350 kg/cm², and once cooled to 420° C. and thereafter again heated up to 460° C. and kept at said elevated temperature for 90 minutes at said pressure. Finally, this was cooled to 200° C., and taken out of the mold. However, the article was cracked. This indicates that the gas generated during the heating remained as voids in the sintered article, and the sintered article was deformed and broken due to the stress as generated by the expansion force of the gas.

Under the same conditions as above except that the time for the sintering at 460° C. was varied to 6 hours, the sintered article was vitrified as having been oxidized and decomposed. This indicates the oxidation and decomposition of the PBI during the sintering step.

In Table 1, shown are the physical properties of the sintered articles as obtained in the above-mentioned Examples of this invention and those of the sintered article as obtained in the above-mentioned Comparative Example which demonstrates the Hoechst Celanese's process. For the physical properties, measured were the tensile strength at breakage, the tensile elongation at breakage and the modulus of tensile elasticity which represent the mechanical properties, the mean thermal expansion coefficient which represents the thermal property, and the dielectric breakdown strength which represents the electric property.

As is known from the data shown in Table 1, the characteristics of the sintered PBI articles as obtained according to the process of this invention are better than those of the sintered PBI article as obtained according to the known process. This is because the sintered articles as obtained according to the process of this invention have few voids therein, and since the sintered articles being manufactured according to the process of this invention are not contacted with oxygen in air during the sintering step, they are hardly oxidized and deteriorated, and therefore their strength is prevented from being lowered.

In addition, since the sintered PBI articles as obtained according to the process of this invention have few voids therein and are oxidized and deteriorated little, there is little dispersion in the quality of the products as obtained according to the process of this invention. Therefore, the process of this invention can produce uniform sintered articles at high yields. Moreover, since the decomposed gas of the PBI can be removed from the sintered PBI articles in their manufacture according to the process of this invention, it is easy to produce thick sintered PBI articles according to the process of this invention.

As has been described in detail hereinabove, in the process of this invention, formation of voids in the sintered PBI articles can be prevented, and spring back of the sintered PBI articles, which makes the articles have oxidized and deteriorated porous parts, can also be prevented. Therefore, according to the process of this invention, it is possible to produce sintered PBI articles having high strength but having neither voids nor porous parts at high yields, and it is easy to produce even thick sintered PBI articles also at high yields.

While the invention has been described in detail and with reference to specific embodiments thereof, it will be apparent to one skilled in the art that various changes and modifications can be made therein without departing from the spirit and scope thereof.

What is claimed is:

1. A process for manufacturing sintered polybenzimidazole articles by sintering a polybenzimidazole resin, which comprises the following steps in that order:
   (1) a step of putting a polybenzimidazole resin into a mold having a predetermined shape;
   (2) a step of closing the mold to thereby compact the polybenzimidazole resin therein, followed by heating the mold up to a predetermined temperature of from 350° C. to 600° C. in the absence of any external pressure to the mold,
   (3) a step of sintering the resin, after having reached the predetermined temperature, in such a manner that said elevated temperature is kept as it is for from 0 to 100 minutes, then the pressure to the mold is increased up to a predetermined pressure of from 140 to 1400 kg/cm², and thereafter said elevated temperature and said increased pressure are kept as they are for from 60 to 250 minutes;
   (4) a step of cooling the mold down to a temperature of from 50° to 400° C.; and
   (5) a step of taking out the sintered polybenzimidazole article from the mold.

2. The process for manufacturing sintered polybenzimidazole articles as claimed in claim 1, which further comprises a step of pre-heating the mold up to a predetermined temperature of from 100° to 400° C., before or after said step (1).

3. The method for manufacturing sintered polybenzimidazole articles as claimed in claim 1, which further comprises a step of compacting the polybenzimidazole resin under a pressure of from 50 to 350 kg/cm² for 30 minutes or shorter, before said heating step (2).

4. The process for manufacturing sintered polybenzimidazole articles as claimed in claims 1, wherein, if the elevated temperature in said sintering step (3) is not lower than the glass transition point of the polybenzimidazole resin used, said cooling step (4) is conducted in such a manner that said increased pressure is kept as it is until the sintered polybenzimidazole article is cooled down to a temperature that is lower than the glass transition point of the polybenzimidazole resin used, and thereafter the external pressure as applied to the sintered polybenzimidazole article is reduced to 0 kg/cm$^2$.

5. The process for manufacturing sintered polybenzimidazole articles as claimed in claims 1, wherein, if the temperature of the sintered PBI article formed after said sintering step (3) is lower than the glass transition point of the polybenzimidazole resin used, said cooling step (4) is conducted in such a manner that said increased pressure is lowered in at least two stages by from 50 to 300 kg/cm$^2$ at intervals of from 5 to 60 minutes.

* * * * *